US010395066B1

(12) United States Patent
Radulov et al.

(10) Patent No.: US 10,395,066 B1
(45) Date of Patent: Aug. 27, 2019

(54) METHOD FOR PROTECTING A CAMERA AND A MICROPHONE FROM UNAUTHORIZED ACCESS

(71) Applicant: KROMTECH ALLIANCE CORP., Road Town, Tortola (VG)

(72) Inventors: Viktor Radulov, Kyiv (UA); Oleksii Shchutskyi, Kyiv (UA); Volodymyr Shelest, Kyiv (UA)

(73) Assignee: KROMTECH ALLIANCE CORP., Road Town, Tortola (VG)

( * ) Notice: Subject to any disclaimer, the term of this patent is extended or adjusted under 35 U.S.C. 154(b) by 0 days.

(21) Appl. No.: 16/203,935

(22) Filed: Nov. 29, 2018

(30) Foreign Application Priority Data

Sep. 28, 2018 (UA) .................... a201809723

(51) Int. Cl.
*G06F 21/62* (2013.01)
*G06F 21/83* (2013.01)
(Continued)

(52) U.S. Cl.
CPC .......... *G06F 21/83* (2013.01); *G06F 21/44* (2013.01); *G06F 21/50* (2013.01); *G06F 21/629* (2013.01)

(58) Field of Classification Search
None
See application file for complete search history.

(56) References Cited

U.S. PATENT DOCUMENTS

2009/0207262 A1\* 8/2009 Kurosawa ............ H04N 5/4403
348/211.99
2012/0221725 A1\* 8/2012 Schroeder, Jr. ......... G06F 9/468
709/225

(Continued)

Primary Examiner — Fatoumata Traore
(74) Attorney, Agent, or Firm — Saliwanchik, Lloyd & Eisenschenk (57) ABSTRACT

The invention relates to digital data processing systems that use a microphone and/or a camera as a means of inputting information. More particularly, the invention relates to the security and protection of computers or computer systems from unauthorized actions by controlling access to a microphone and/or a camera from software applications that request access to the function of a microphone and/or camera.

A method for protecting a camera and microphone from unauthorized access comprising determining the list of audio devices and USB devices, connected to a computer system, using the system registry of computer system devices, obtaining a list of computer system camera identifiers, tracking the creation of records of process requests to access the camera and the microphone in the system registry of computer system devices, storing last record information on the process requesting access to the camera or the process requesting access to the microphone from the system registry of computer system devices, screening the process requesting access to the camera or the process recording sound through the microphone against a process whitelist according to the last stored record information, opening access to the camera and to the microphone for the whitelisted process or sending a message of the unavailabil- (Continued)

ity of the camera and blocking sound recording through the microphone for an unknown process, informing the user about the process request to access the camera or the sound recording process that are not on the process whitelist, adding the process requesting access to the camera and/or the sound recording process, which is not on the process whitelist, to the process whitelist or blocking the process requesting access to the camera or the process recording sound through the microphone.

9 Claims, 4 Drawing Sheets

(51) Int. Cl.
 *G06F 21/50* (2013.01)
 *G06F 21/44* (2013.01)

(56) References Cited

U.S. PATENT DOCUMENTS

2013/0286225 A1 10/2013 Stedman et al.
2014/0096219 A1* 4/2014 Lang ................ H04N 21/25875
 726/9

* cited by examiner

METHOD FOR PROTECTING A CAMERA AND A MICROPHONE FROM UNAUTHORIZED ACCESS

CROSS-REFERENCE TO RELATED APPLICATION

This application claims the benefit under 35 U.S.C. § 119 of Ukrainian Application No. a201809723, filed Sep. 28, 2018, which is hereby incorporated in its entirety.

FIELD OF THE INVENTION

The invention relates to digital data processing systems that use a microphone and/or a camera as a means of inputting information. More particularly, the invention relates to the security and protection of computers or computer systems from unauthorized actions by controlling access to a microphone and/or a camera from software applications that request access to the function of a microphone and/or camera.

BACKGROUND OF THE INVENTION

The problem for the computer system security from software applications using functions of microphones and cameras of the computer system through an operating system is known in the art. The danger lies in possible unauthorized access to the functions of a microphone and/or camera from a software application. As a result, the computer system can capture a sound and/or image without the user's knowledge, including remotely. Audio and/or video data so collected may be transmitted outside the computer system over Internet channels using data exchange and providing protocols known in the art. In this case, a user may not even notice an unauthorized use of the microphone and/or camera, given a very short time of access to the function of these devices.

The said problem of controlling access to the microphone and/or camera function is solved by identifying processes (software applications) that request access to the microphone and/or camera function followed by the use of the microphone and/or camera access permissions system for the identified processes (software applications). To request access, processes receive information on microphones and cameras available in a computer system through elements of an operating system. If they receive information on the availability of a camera and/or microphone in the system, a process tries to get access and start recording video and/or audio (to create a media stream). When no permission is given, the process is identified and a message of the impossibility to start recording through a microphone and/or camera is sent. Thus, the access to the function of a microphone and/or camera is controlled by controlling media streaming.

A similar approach is disclosed in US20130286225A1 dd. Oct. 31, 2013, where a media stream (of video and/or audio data) from a camera upon request of the process (software application) is blocked using a low level filter driver the computer system is equipped with. Said driver is blocked by default and may be unblocked from the side of a computer system user, once the user has been informed of the created media stream, or may be unblocked automatically. In this case, the information on cameras available in the computer system is accessible to all processes (software applications) operating in the computer system, and the unauthorized receipt of video and/or audio data is terminated by controlling the access to a media stream created by the camera, with the process informed of the availability of the camera and requesting access to its functions.

In some cases, such an approach leads to the termination of recording through a microphone and/or camera well after a media streaming was started. This can lead to short-term unauthorized capture of a sound and/or image without the user's knowledge and breach of the computer system security.

Therefore, solutions are required to secure the computer system and inhibit unauthorized capture of a sound and/or image at a lower level, for example, not by controlling requests of processes (software applications) to access the functions of the camera, but rather by controlling the access of processes (software applications) to information about the availability of cameras in the computer system. That is, the process (software application) will not be able to access the functions of the camera because with the first request the process (software application) will receive information about the unavailability of the camera in the computer system and will be able to get access once a user has given his/her separate permission depending on his/her decision and the information about cameras available in the computer system has been sent. In addition, the process (software application) will not be able to start recording via the microphone because with the first request the process (software application) will be «frozen»/blocked.

SUMMARY OF THE INVENTION

Embodiments of the present invention provide a method for protecting a camera and microphone from unauthorized access and a computer information processing system wherein said method for protecting a camera and microphone from unauthorized access is implemented, as well as a tangible non-transitory machine-readable media equipped with a set of instructions for a computer system processor to protect the camera and microphone from unauthorized access in accordance with said method. To achieve this, the following technical solutions are possible.

The invention is intended to inhibit unauthorized use of a microphone and/or camera in a computer system by third-party software applications.

The technical result of the invention is the determination of software applications/processes (hereinafter referred to as applications/processes) that use functions of a camera or a microphone, preferably on Mac OS (Apple Inc©), with an option to block such applications/processes.

According to one aspect of the present invention, there is provided a method for protecting a camera and microphone from unauthorized access comprising determining the list of audio devices and USB devices, connected to a computer system, using the system registry of computer system devices, obtaining a list of computer system camera identifiers, tracking the creation of records of process requests to access the camera and the microphone in the system registry of computer system devices, storing last record information on the process requesting access to the camera or the process requesting access to the microphone from the system registry of computer system devices, screening the process requesting access to the camera or the process recording sound through the microphone against a process whitelist according to the last stored record information, opening access to the camera and to the microphone for the whitelisted process or sending a message of the unavailability of the camera and blocking sound recording through the microphone for an unknown process, informing the user about the process request to access the camera or the sound recording process that are not on the process whitelist, adding the process requesting access to the camera and/or the sound recording process, which is not on the process whitelist, to the process whitelist or blocking the process requesting access to the camera or the process recording sound through the microphone.

In one embodiment of the method, the determination of the list of cameras in the computer system comprises the identification of all USB devices, connected to the computer system, using the system registry of computer system devices followed by the identification of cameras among said devices using the list of identifiers of all cameras obtained through the system component for the identification of computer system devices.

According to another embodiment of the method, the determination of the list of audio devices and USB devices in the computer system comprises tracking new records created in the system registry about a new audio device and/or a new USB device in the computer system.

According to yet another embodiment of the method, the determination of the list of cameras in the computer system comprises updating the camera list upon obtaining data on the creation of a new camera identifier from the system component for the identification of computer system devices.

According to the second aspect of the invention, there is provided a computer information processing system comprising a computing device with at least one processor and a tangible non-transitory machine-readable media coupled thereto, said tangible non-transitory machine-readable media comprising an operating system, a set of instructions performable by a processor, and a subsystem for the control of access to a camera and a microphone coupled to the computer system, said subsystem comprising at least a control module coupled to the system component for the identification of computer system devices and suitable for accessing records of the system registry of computer system devices, and a module that controls processes of the computer system requests to access audio devices and cameras and processes of audio device and camera requests to access the computer system (hereinafter referred to as the process service module) connected to the control module. The control module is suitable for obtaining and transferring computer system camera identifiers to the process service module. The control module is also suitable for informing the user of an unknown process requesting access to the camera or an unknown sound recording process. The control module is also suitable for adding the unknown process requesting access to the camera or the unknown sound recording process to the process whitelist or for sending a command to the process service module to block the unknown process requesting access to the camera or the unknown process recording sound through the microphone. The process service module is suitable for obtaining data from the control module about adding the unknown process requesting access to the camera or the unknown sound recording process to the process whitelist. The process service module is also suitable for obtaining and storing last record information on creating a process requesting access to the camera or process requesting access to the microphone from the system registry of computer system devices. The process service module is also suitable for screening the process requesting access to the camera or the process recording sound through the microphone against the process whitelist according to last stored record information. The process service module is also suitable for opening access to the camera or the microphone for the whitelisted process or for informing on the unavailability of the camera and blocking sound recording through the microphone for an unknown process.

In one embodiment of the computer system, the process service module is suitable for determining the list of cameras in a computer system using a system registry of computer system devices to identify all USB devices connected to the computer system followed by the identification of cameras among said devices using a list of identifiers of all cameras obtained with the help of the system component for the identification of computer system devices.

According to another embodiment of the computer system, the process service module is suitable for automatic tracking of new records created in the system registry about a new audio device and/or a new USB device in a computer system.

According to yet another embodiment of the computer system, the control module is suitable for automatic obtaining of data on new camera identifiers created in the computer system from the system registry of computer system devices and for transmitting the data so obtained to the process service module.

According to the second aspect of the invention, there is provided at least one tangible non-transitory machine-readable media comprising a set of commands performable by a computer system processor to determine the list of audio devices and USB devices connected to the computer system using the system registry of computer system devices, to obtain a list of computer system camera identifiers, to track the creation of records of process requests to access a camera and process requests to access a microphone in the system registry of computer system devices, to store last record information on the process requesting access to the camera or the process requesting access to the microphone from the system registry of computer system devices, to screen the process requesting access to the camera or the process recording sound through the microphone against the process whitelist based on last stored record information, to open access to the camera and to the microphone for the whitelisted process or to notify of the unavailability of the camera and to block the sound recording through the microphone for the unknown process, to notify the user of the process requesting access to the camera or the sound recording process, which are not on the process whitelist, to add the process requesting access to the camera and/or sound recording process, which are not on the process whitelist, to the process whitelist or to block the process requesting access to the camera or the process recording sound through the microphone.

In one embodiment, a machine-readable media determines a list of cameras in a computer system by identifying all USB devices connected to the computer system using a system registry of computer system devices followed by the identification of cameras among said devices using the list of identifiers of all cameras received with the help of the system component for the identification of computer system devices.

According to yet another embodiment, the machine-readable media determines a list of audio devices in a computer system by tracking new records created in the system registry about a new audio device and/or USB device in the computer system.

According to yet another embodiment, the machine-readable media updates the camera list upon obtaining data on the creation of a new camera identifier from the system component for the identification of computer system devices.

Unlike solutions where access to a camera function is controlled by identifying processes that access a camera in the user system, the proposed solution provides a possibility to block such processes at a low level without allowing the processes to access the camera at all. Further, the present invention provides that all processes using a camera have access to information on the availability of cameras in a computer system only through a separate subsystem that controls access to a camera coupled to a computer system that is one of the objects of this invention. Still further, the proposed invention provides the possibility to generally control access to all cameras coupled to a computer system. For example, a computer system (such as a laptop or a similar device as described more specifically below) is equipped with a built-in camera and coupled to an external camera. Said access control subsystem makes the external camera invisible to all processes (hides the external camera), while the internal camera is left available, or vice versa. The access control subsystem also provides the possibility to hide all the cameras in the computer system. Therefore, any process requesting access to the camera through the operating system will have to obtain permission from said access control subsystem first. The access control subsystem will notify a computer system user accordingly. If the user gives a command to permit the process to access the camera, the access control subsystem provides the process with the information about cameras connected to the computer system and allows the process to access the camera. While attempting to use the microphone, the proposed access control subsystem freezes/allows the recording media stream (audio data).

With the proposed solution, no process sees cameras available in the system. All process requests to access the camera pass through the access control subsystem and, at first, the process receives information on the unavailability of the device it requests. That is, unlike the solutions known in the art that control access to a media stream, which has been already created through the camera, the proposed solution allows first to hide the availability of a camera in a computer system from a process. Access control at such a low level increases the computer system security on the side of software applications, which use the functions of microphones and cameras, by disabling unauthorized media streaming, even for a short period of time.

It is to be understood that both the foregoing general description and the following detailed description are merely exemplary and explanatory and are not restrictive of the claimed invention.

BRIEF DESCRIPTION OF THE DRAWINGS

The accompanying drawings are incorporated in and constitute a part of this description of the invention. The drawings illustrate embodiments and, together with the description, serve to explain principles of the invention.

DETAILED DESCRIPTION

Illustrative embodiments are described in detail below with reference to the accompanying drawings. The illustrative embodiments described below are in no way intended to cover all possible embodiments of the invention but serve to further explain the disclosure of the invention.

Figure 1:
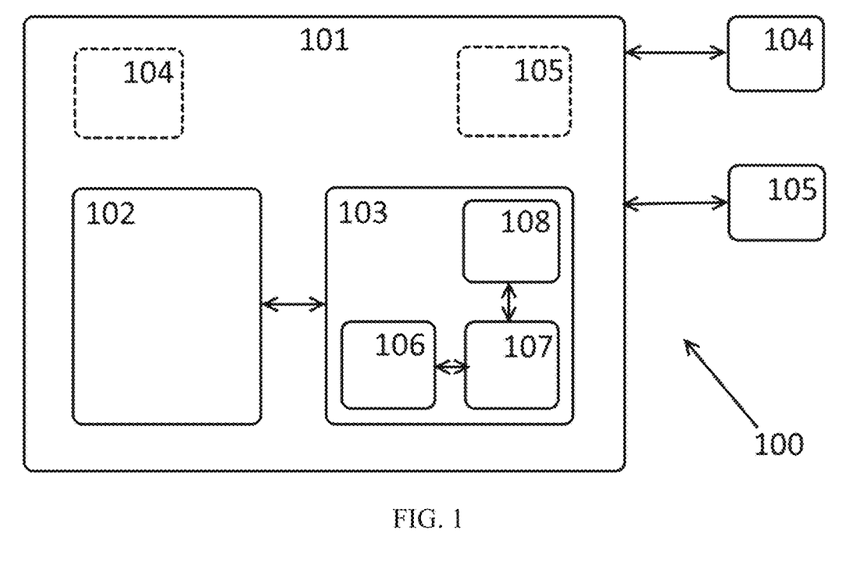
FIG. 1 illustrates a diagram showing a computer system wherein a method for protecting a camera and a microphone from unauthorized access is implemented in accordance with some illustrative embodiments of the invention.

FIG. 1 illustrates a diagram demonstrating a computer system wherein a method for protecting a camera and a microphone from unauthorized access is implemented in accordance with some illustrative embodiments of the invention.

According to FIG. 1, a computer system 100 comprises a computing device 101 with one or more processors 102 and a tangible non-transitory machine-readable media 103 coupled to the computing device 101. The computing device 101 may be a personal computer, a portable computer (laptop) and similar devices, such as those manufactured by Apple Inc©, e.g. iMac, MacBook and other similar devices, equipped with means for inputting information to the computer system 100 (a keyboard, touch pad, computer mouse, etc.) or configured so that such means can be connected thereto, and means for outputting information (a screen, speakers, etc.). Means of inputting information include means for inputting visual information, such as a camera 104, and audio information, such as a microphone 105. The camera 104 or the microphone 105 may be built-in in the computing device 101, e.g. a camera and a microphone of a desktop or laptop computer. The camera 104 and the microphone 105 may be external devices connected through a serial interface to the computing device 101, e.g. a USB camera or an external microphone, a headset for IP telephony, and the like. The processor 102 may be an Ax processor (Apple Inc©) or Ivy Bridge, Haswell, Skylake processor (Intel Core©) and the like. The machine-readable media 103 comprises an external memory of the computer system 100, e.g. solid state drive (SSD), for storing software applications and data 106. The machine-readable media 103 also comprises internal memory that contains non-volatile read-only memory (ROM) and random-access memory (RAM) configured to store a set of instructions performable by the processor 102. The machine-readable media 103 is equipped with an operating system 107, e.g. Mac OS (Apple Inc©). Said set of instructions includes, in particular, a sequence of operations using the functions of the camera 104 and/or microphone 105 on the side of the operating system 107 and software applications 106. Examples of software applications may include Skype©/Telegram©/Facetime© or other similar software applications that request access to the microphone or camera functions. In particular, said set of instructions permits all steps of the operation of the subsystem that controls access to the camera and microphone coupled to the computer system 108 located on the tangible non-transitory machine-readable media 103.

Figure 2:
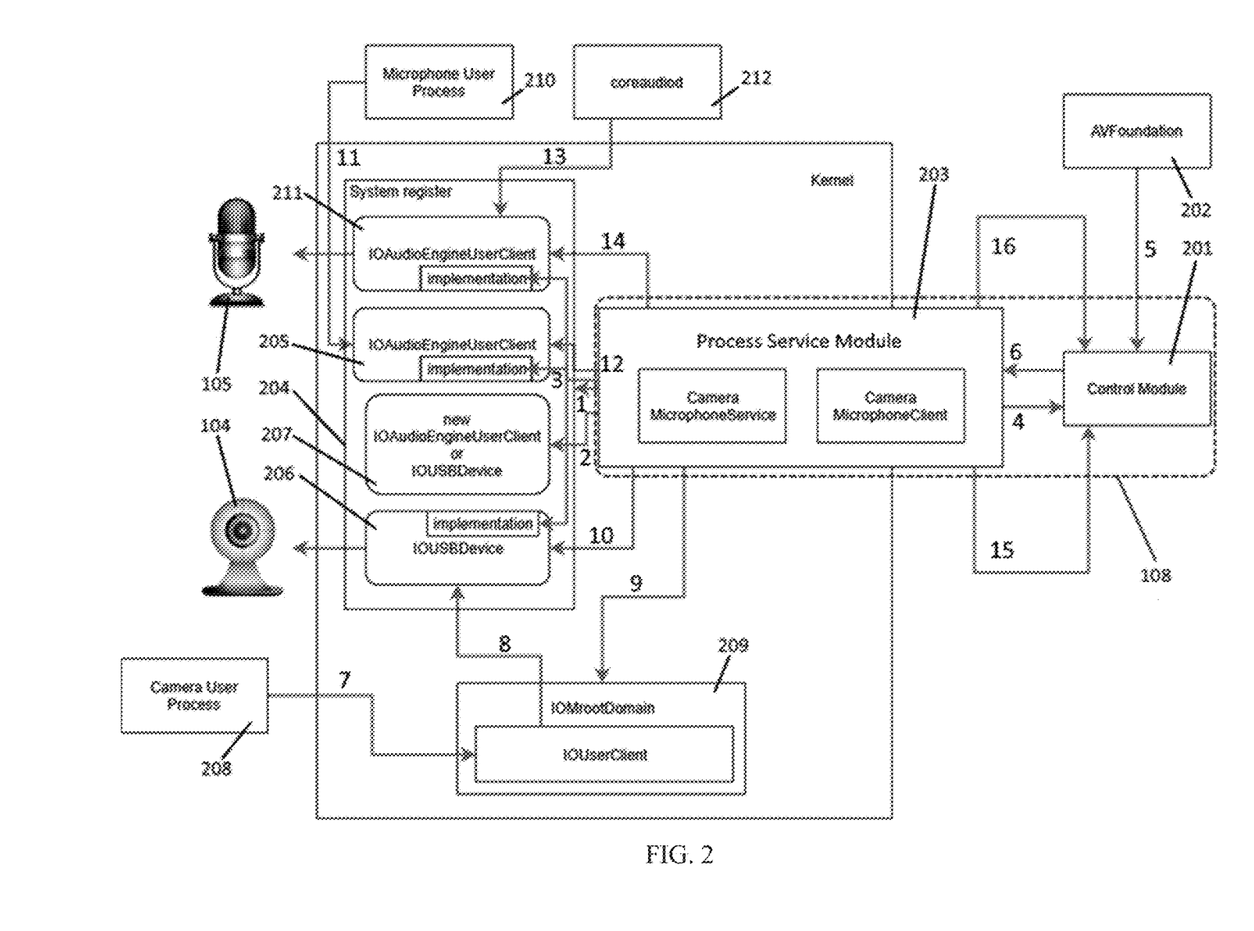
FIG. 2 illustrates a flowchart showing a subsystem, installed on a tangible non-transitory machine-readable media, which controls access to a camera and microphone coupled to a computer system.

FIG. 2 illustrates the subsystem that controls access to the camera and microphone coupled to the computer system 108 used for the computer system 100 equipped with MacOS (Macintosh Operating System) developed by Apple Inc. According to FIG. 2, the subsystem that controls access to the camera and microphone coupled to the computer system 108 comprises a control module 201 coupled to the system component for the identification of computer system devices 202 and a module that controls processes of computer system requests to access audio devices and cameras and the processes of audio device and camera requests to access the computer system (process service module 203) connected to the control module 201. The subsystem that controls access to the camera and microphone coupled to the computer system 108 may, together with said components, be installed as a software application on the tangible non-transitory machine-readable media 103 together with the operating system 107.

A system component 202 (AVFoundation system framework) is a component of the operating system (MacOS) responsible for reading all audio/video recording devices in the computer system 100. Audio/video recording devices and parameters thereof are identified using the system component 202. The system component 202 is configured so that it automatically sends a list of identifiers of all cameras in the computer system 100 and notifies of the creation of a new camera identifier to keep the camera list updated.

The control module 201 is suitable for accessing records of a system registry of computer system devices 204. The control unit 201 is suitable for automatic obtaining data on new identifiers of cameras 104 created in the computer system 100 from the system registry of computer system devices 204 and for transmitting the data so obtained to the process service module 203. The control module 201 is suitable for informing a user about an unknown process requesting access to the camera 104 or an unknown sound recording process. The control module 201 is suitable for adding the unknown process requesting access to the camera 104 or the unknown sound recording process in the process whitelist or sending a command to block the unknown process requesting access to the camera 104 or the unknown process recording sound through the microphone 105 to the process service module 203.

The process service module 203 is suitable for determining the list of cameras in the computer system 100 through the system registry of computer system devices 204 by identifying all USB devices connected to the computer system 100 followed by the identification of the cameras 104 among said devices using the list of identifiers of all cameras obtained with the help of the system component for the identification of computer system devices 202 (AVFoundation). The process service module 203 is also suitable for automatic tracking of the new records created in the system registry 204 about a new audio device and/or a new USB device in the computer system 100. The process service module 203 is suitable for obtaining and storing last record information on the creation of the process requesting access to the camera or the process requesting access to the microphone 105 from the system registry of computer system devices 204. The process service module 203 is suitable for screening the process requesting access to the camera 104 or the process recording sound through the microphone 105 against the process whitelist according to the last stored record information. The process service module 203 is also suitable for opening access to the camera 104 or the microphone 105 for the whitelisted process or for informing on the unavailability of the camera 104 and blocking sound recording through the microphone 105 for an unknown process. The process service module 203 can itself have a modular structure and comprise components (modules) such as CameraMicrophoneService and CameraMicrophoneClient (FIG. 2) with the CameraMicrophoneService module of the process service module 203 being connected to the control module 201 through the CameraMicrophoneClient module.

The flowchart in FIG. 2 also shows the steps of controlling access to the camera 104 and the microphone 105 connected to the computer system to protect them against unauthorized access using the subsystem 108 described above.

At step 1, the process service module 203 determines a list of audio devices and USB devices connected to the computer system 100 with the help of the system registry of computer system devices 204. The determination of the list of audio devices means the acquisition of data on all IOAudioEngineUserClient objects 205 (all audio devices, i.e. audio devices capable of recording or replaying and processing audio data) by the process service module 203. The determination of the list of USB devices means the acquisition of the data on all IOUSBDevice objects 206 (all USB devices, i.e. an USB keyboard, USB flash drive, USB camera and other similar devices which are connected to the computer system 100 through the USB (Universal Serial Bus) interface) by the process service module 203. The determination of the list of USB devices is required to further identify cameras available in the system, since a camera, even those built in in the computer system, is also a USB device as it is connected to the computer system through the USB interface.

The determination of the list of audio devices and UBS devices of the computer system 100 involves the subsequent tracking of new records created in the system registry 204 about a new audio device and a new USB device in the computer system 100 (step 2). For this purpose, the process service module 203 is subscribed to information on the creation of new IOAudioEngineUserClient and IOUSBDevice objects 207 by continuous monitoring of the list of devices in the system registry 204 by the process service module 203. If a new device is connected to the computer system 100, a new record is created in the system registry 204 whereof is automatically notified to the process service module 203.

After the process service module 203 receives the list of audio devices and USB devices in the computer system 100, step 3 is performed, at which the implementation of the list of audio devices and USB devices is replaced by the implementation through the process service module 203, which provides the initial functionality of said devices and additional screening of the application/process requesting access to the functions of the microphone and/or the camera through the access control subsystem 108. The implementation of the device means a set of instructions whereby the data between the devices, in particular, audio devices and USB devices, and the computer system 100 are exchanged. The access control subsystem 108 essentially replaces this set of instructions and starts to function as 'a relay' which disables and enables a data exchange chain between the devices and the computer system 100. After the substitution of the implementation, any request of a device to the system or of the system to the device is given through the process service module 203, which has the function of authorizing or prohibiting the request so received. Therefore, the implementation of functions of audio devices and USB devices and the request to access their functions from the side of applications/processes is necessarily carried out through the process service module 203 which serves as the first and necessary link in the data exchange chain between the devices and the computer system 100.

After replacing the implementation of functions of audio devices and USB devices through the access control subsystem 108, the camera 104 and the microphone 105 are protected against unauthorized access separately.

The flowchart in FIG. 2 shows steps 5-10, 15, and 16 which provide protection against unauthorized access for the camera 104. Thus, at step 5, the list of cameras 104 in the computer system 100 is determined among the USB devices identified at the preceding steps. To determine the list of cameras 104, the control module 201 sends a request for a list of camera identifiers in the computer system 100 to the system component for the identification of computer system devices 202 (AVFoundation). This is necessary to identify cameras among all other USB devices, which may be a USB keyboard, a USB flash drive and other similar devices connected to the computer system 100 through the USB interface. The list of camera identifiers of the computer system 100 so obtained by the control module 201 is transmitted to the process service module 203 (step 6). The process service module 203 identifies cameras 104 among USB devices identified before based on the list of camera identifiers. This step starts replacing the implementation of the functions of devices by the implementation through the access control subsystem 108 starts by controlling the entire data exchange between the camera 104 and the system. The access control subsystem 108 blocks all processes that request access to the camera 104 by default.

One the cameras 104 have been identified, the list of cameras 104 is updated by obtaining data on the creation of a new camera identifier from the system component for the identification of computer system devices 202 by subscribing the process service module 203.

At step 7, the creation of records of process requests to the camera 104 in the system registry of computer system devices 204 is monitored. The record of process 208 that requires access to the camera 104 is created in the system registry 204 in IOUserClient branches in IOMrootDomain 209.

At step 8, the process 208 that requires access to the camera 104 attempts to access it.

At step 9, the last stored record information on the process 208 requesting access to the camera 104 from the system registry of computer system devices 204 are stored by obtaining the last record created in IOUserClient branch by the process service module 203.

At step 10, the process 208 requesting access to the camera 104 is screened against the process whitelist according to the last stored record information. Based on the list of camera identifiers obtained by the process service module 203, the USB device is screened to identify whether it is a camera. If the USB device (IOUSBDevice) is a camera, then the process service module 203 does not allow the process to access the camera. If the process 208 requesting access to the camera is in the process whitelist, the process service module 203 allows the process to access the camera 104.

At step 15, the process service module 203 sends a message to the control unit 201 to connect the process to the camera 104. The control module 201 provides a user with information about the process intending to access the camera.

At step 16, depending on a subsequent user choice, the control module 201 sends a process whitelist to the process service module 203. Thus, the process intending to access the camera 104, which is not in the process whitelist, is added to the process whitelist or blocked.

Figure 3:
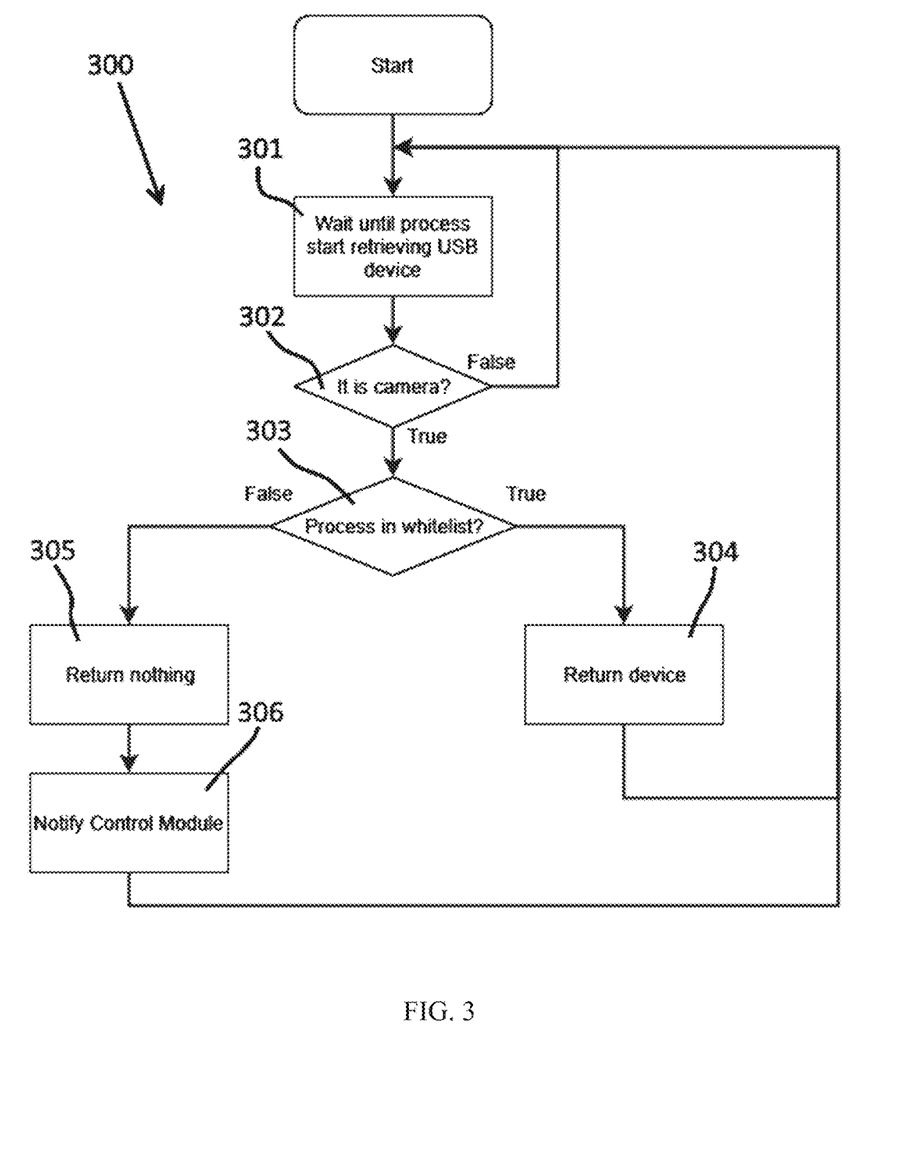
FIG. 3 illustrates a flowchart showing an algorithm of how said access control subsystem operates when access to a camera is requested.

An illustrative embodiment of blocking access for applications/processes to the camera 104 using the proposed method is shown by the flowchart of the algorithm 300 in FIG. 3.

As shown in FIG. 3, the method for protecting the camera from unauthorized access may involve the following steps.

At step 301, the process request to functions of a USB device is awaited (the matchPropertyTable method is requested in the IOUSBDevice).

At step 302, the type of the device IOUSBDevice is checked using the process service module 203. If the device identifier is on the camera identifier list, then the last record in the IOMRootDomain branch 209 of the system registry 204 is found using the process service module 203.

At step 303, the value of the IOUserClientCreator property is obtained though the process service module 203 to determine the process that requests access to the camera 104 and the process is then screened against the process whitelist (the whitelist).

If the process is in the process whitelist, at step 304, the process service module 203 opens access to the camera 104 for the whitelisted process.

If the process is not on the process whitelist (i.e., the process is unknown), then, for the unknown process, a message is generated that the camera is not available in the computer system 104 (step 305) and the user is notified of the unknown process requesting access to the camera 104 through the control module 201 (step 306).

Next, the process, which requested access to the camera and which is not on the process whitelist (i.e. an unknown process), is added to the process whitelist, depending on the user's choice, through the control module 201. Thus, a new process whitelist is formed using the control module 201, and then the method for protecting the camera from unauthorized access starts with step 301.

Unlike camera protection, in case of microphone access control, microphones are not identified among all audio devices obtained at step 1 according to FIG. 2. Whether the device to which the process requests access is a microphone is determined at the moment of audio streaming. If the audio streaming is a sound recording process, the audio streaming device is then defined as a microphone.

The flowchart in FIG. 2 shows steps 11-16 that provide protection of the microphone 105 against unauthorized access. Thus, at step 11, the process 210, which requests access to the microphone 105, creates a record in the IOAudioEngineUserClient branch 211 of the system registry 204.

At step 12, last record information on the process 210 requesting access to the microphone from the IOAudioEngineUserClient branch 211 of the system registry 204 is stored using the process service module 203.

At step 13, the process tries to start the sound recording by creating an appropriate record in the IOAudioEngineUserClient branch 211 using the system element coreaudiod 212. Coreaudiod 212 is a Mac OS system element through which sound recording is initiated by all processes. For this purpose, coreaudiod 212 creates its record in the IOAudioEngineUserClient 211 branch of the system registry 204.

At step 14, the process service module 203 screens the sound recording process 210 through the microphone 105 against the process whitelist according to the last stored record information and opens access to the microphone 105 for the whitelisted process 210 or blocks the sound recording through the microphone 105 for the unknown process 210, which is not on the process whitelist. The process service module 203 may also disable the microphone 105 if the process 210 is on the process blacklist.

At step 15, the process service module 203 sends to the control module 201 a message of the intention to connect the process to the microphone 105. The control module 201 informs the user of a sound recording process which is not on the process whitelist.

At step 16, the control module 201 provides the user with information about the process/processes requesting access to the microphone 105. Depending on subsequent user's choice, the control module 201 sends a process whitelist to the process service module 203. Thus, the sound recording process which is not on the process whitelist is added to the process whitelist or the process recording sound through the microphone 105 is blocked.

That is, steps 15 and 16, as shown in FIG. 2, are equally applicable to the control of access to the camera 104 and to the control of access to the microphone 105.

Figure 4:
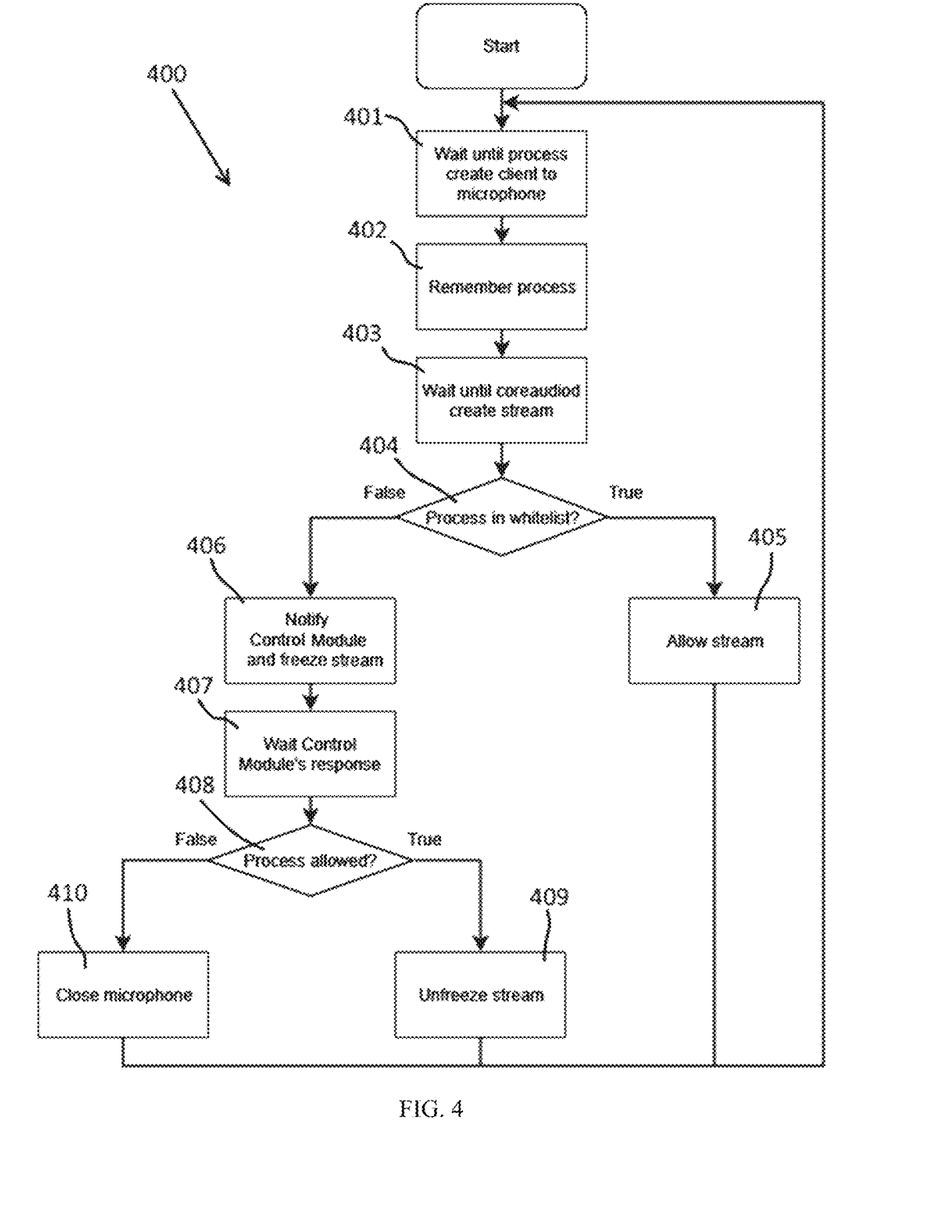
FIG. 4 illustrates a flowchart showing an algorithm of how said access control subsystem operates when access to a microphone is requested.

The flowchart in FIG. 4 illustrates the embodiment of the blocking of applications/processes accessing the microphone 105 using the proposed method.

As shown in FIG. 4, a method for protecting a microphone from unauthorized access may involve the following steps.

At step 401, the process that requires the microphone 105 creates an IOAudioEngineUserClient 205 object in the system registry 204.

At step 402, last record information on the process requesting access to the microphone 105 from the system registry 204 is stored.

At step 403, data on the sound stream recording through the system element coreaudiod 212 and the intention to start the audio recording using the created object IOAudioEngineUserClient 205 are obtained.

At step 404, the process recording sound through the microphone 105 is screened against the process whitelist according to the last stored record information by the process service module 203. If the process is on the process whitelist, audio streaming is then authorized through the coreaudiod 212 (step 405) using the process service module 203. If the process is not on the process whitelist sound recording through the microphone 105 is blocked using the process service module 203 (the audio recording stream is frozen) and the respective message is then sent to the control module 201 (step 406).

At step 407, a response is awaited from the control module 201 to authorize or prohibit the use of the microphone 105.

At step 408, the response is received from the control module 201.

If the control module 201 authorizes the use of the microphone 105, the process recording sound through the microphone is then started (the sound recording stream is unfrozen, step 409).

If the control module 201 prohibits using the microphone 105, the access to the microphone 105 for this process is blocked (step 410).

The method described above can be explained in practice by the example of its specific application in the computer system 100, with the computing device 101 equipped with the access control subsystem 108 and with Skype© installed on the tangible non-transitory machine-readable media, and the software application Skype© has the function of accessing the camera 104 and the microphone 105.

Skype© intends to access the camera 104 and/or the microphone 105 installed on the computer system 100. For this purpose, Skype© refers to the system frameworks CoreMediaIO and CoreAudio, the system components responsible for operating video recording and audio recording devices, respectively. CoreMediaIO and CoreAudio, in turn, receive data from all USB devices through the computing device 101 using IOUSBDevice objects 206. Using a list of camera identifiers from the system component 202, the process service module 203 checks whether a USB device is a camera. The last record created in the IOUserClient branch is then found through the process service module 203, and the IOUserClientCreator property is obtained from it. Next, using the process service module 203, the process is screened against the process whitelist. If the process is not on the process whitelist, the camera is disabled for this process. In case of Skype© this means that the computer system 100 does not have a camera. After this, the control module 201 receives a message from the process service module 203 about the process intending to use the camera 104. After receiving the user's permission to access the camera 104 from the control module 201, the camera 104 is reconnected and the process of accessing the camera 104 is repeated, but this process will already be on the process whitelist.

Another possible illustrative embodiment of the process blocking is as follows. Once launched, an application having a camera access function (e.g. Telegram©) creates a record in the IOUserClient branch of the system registry 204. The process service module 203 receives information about creating a Telegram© record from IOUserClient. To use the camera, Telegram© creates another IOUserClient record and sends a request to the branch IOUSBDevice 206 of the system registry 204 to obtain a camera list of the computer system 100. The last record in IOUserClient is checked against a USB identifier of the device to which access is requested by Telegram© using the process service module 203. If the USB device is a camera, the process service module 203 screens Telegram© against the process whitelist. If Telegram© is on the process whitelist, the camera list of the computer system 100 is then sent through the process service module 203. If Telegram© is not on the process whitelist, a message about the absence of cameras in the computer system 100 is then sent to Telegram© and a message that Telegram© intends to access the camera 104 is sent from the process service module 203 to the control module 201. The control module 201 informs the user that Telegram© intends to access the camera through the means of outputting information, such as a computing device screen, etc. If the user allows Telegram© to access the camera 104, the control module 201 sends a message to the process service module 203 to reconnect the camera 104 for Telegram©. Telegram© receives information that the computer system 100 has a camera 104. The process of connecting Telegram© to the camera 104 is then repeated, given that Telegram© "sees" the camera 104 because Telegram© was added by the user to the process whitelist at the previous step.

The invention claimed is:
1. A method for protecting a camera and a microphone from unauthorized access comprising:
   determining a list of audio devices and Universal Serial Bus (USB) devices connected to a computer system by a system registry of devices of the computer system,
   obtaining a list of computer system camera identifiers to identify all cameras in the computer system,
   tracking creation of records of process requests to access the camera and the microphone in the system registry of devices of the computer system, storing last record information on the process requesting access to the camera or the process requesting access to the microphone from the system registry of devices of the computer system, screening the process requesting access to the camera or a process recording sound through the microphone against a process whitelist according to the last stored record information, providing access to the camera and to the microphone for the whitelisted process or sending a message of unavailability of the camera and blocking sound recording through the microphone for an unknown process, informing a user about the process request to access the camera or the sound recording process that are not on the process whitelist, adding the process requesting access to the camera and/or the sound recording process, which are not on the process whitelist, to the process whitelist or blocking the process requesting access to the camera or the process recording sound with the microphone, wherein identifying all cameras in the computer system comprises an identification of all USB devices connected to the computer system by the system registry of devices of the computer system followed by an identification of cameras among the devices by the list of identifiers of all cameras obtained through a system component for identification of computer system devices.

2. The method of claim 1 wherein the determining the list of audio devices and USB devices in the computer system comprises tracking new records created in the system registry for a new audio device and/or a new USB device in the computer system.

3. The method of claim 2 identifying all cameras in the computer system comprises updating a camera list upon obtaining data on the creation of a new camera identifier from the system component for identification of computer system devices.

4. A computer information processing system comprising a computing system with at least one processor and a tangible non-transitory machine-readable medium coupled thereto, the tangible non-transitory machine-readable medium comprising an operating system, a set of instructions implemented by the at least one processor, and a subsystem for control of access to a camera and a microphone coupled to the computer system, the subsystem comprising:

a controller coupled to a system component for identification of computer system devices and for accessing records of a system registry of devices of the computer system, and a process service provider that controls processes of computer system requests to access audio devices and cameras and processes of audio device and camera requests to access the computer system and is connected to the controller, wherein the controller obtains and transfers computer system camera identifiers to the process service provider, wherein:

the controller informs a user of an unknown process requesting access to the camera or an unknown sound recording process, the controller adds the unknown process requesting access to the camera or the unknown sound recording process to a process whitelist or sends a command to the process service provider to block the unknown process requesting access to the camera or the unknown process recording sound through the microphone, the process service provider obtains data from the controller for adding the unknown process requesting access to the camera or the unknown sound recording process to the process whitelist, the process service provider obtains and stores last record information on creating a process requesting access to the camera or process requesting access to the microphone from the system registry of devices of the computer system, the process service provider screens the process requesting access to the camera or the process recording sound through the microphone against the process whitelist according to last stored record information, the process service provider provides access to the camera or the microphone for the whitelisted process or informs on unavailability of the camera and blocking sound recording through the microphone for an unknown process, and wherein the process service provider determines a list of cameras in the computer system by the system registry of devices of the computer system to identify all Universal Serial Bus (USB) devices connected to the computer system, followed by an identification of cameras among the devices by the list of identifiers of all cameras obtained with assistance of the system component for the identification of computer system devices.

5. The computer system of claim 4 wherein the process service provider automatically tracks new records created in the system registry for a new audio device and/or a new USB device in the computer system.

6. The computer system of claim 4 wherein the automatically obtains data on new camera identifiers created in the computer system from the system registry of devices of the computer system and transmits the data obtained to the process service provider.

7. At least one tangible non-transitory machine-readable medium comprising a set of commands implemented by a computer system processor:

determining a list of audio devices and Universal Serial BUS (USB) devices connected to a computer system by a system registry of devices of the computer system, obtaining a list of computer system camera identifiers, tracking creation of records of process requests to access a camera and process requests to access a microphone in the system registry of devices of the computer system, storing last record information on the process requesting access to the camera or the process requesting access to the microphone from the system registry of devices of the computer system, screening the process requesting access to the camera or the process recording sound through the microphone against the process whitelist based on the last stored record information, providing access to the camera and to the microphone for the whitelisted process or to notify of unavailability of the camera and to block the sound recording through the microphone for an unknown process, notifying a user of the process requesting access to the camera or the sound recording process that is not on the process whitelist, adding the process requesting access to the camera and/or sound recording process that are not on the process whitelist to the process whitelist or to block the process requesting access to the camera or the process recording sound through the microphone, and determining of a list of cameras in the computer system by identifying all USB devices connected to the computer system by a system registry of devices of the computer system, followed by an identification of cameras among the devices by the list of identifiers of all cameras received with assistance of a system component for the identification of devices of the computer system.

8. The machine-readable media of claim 7 further comprising determining a list of audio devices in the computer system by tracking new records created in the system registry for a new audio device and/or USB device in the computer system.

9. The machine-readable media of claim 7 further comprising updating the camera list upon obtaining data on the creation of a new camera identifier from the system component for identification of computer system.

\* \* \* \* \*

UNITED STATES PATENT AND TRADEMARK OFFICE
CERTIFICATE OF CORRECTION

PATENT NO. : 10,395,066 B1
APPLICATION NO. : 16/203935
DATED : August 27, 2019
INVENTOR(S) : Viktor Radulov, Oleksii Shchutskyi and Volodymyr Shelest It is certified that error appears in the above-identified patent and that said Letters Patent is hereby corrected as shown below:

Column 13,
Line 35, Claim 2 "identifying all" should read --wherein the identifying all--.

Column 14,
Lines 34-35, Claim 6 "wherein the automatically" should read --wherein the controller automatically--.

Column 15,
Line 19, Claim 9 "for identification of computer system" should read --for identification of devices of the computer system--.

Signed and Sealed this
Seventh Day of April, 2020

Andrei Iancu
*Director of the United States Patent and Trademark Office*